United States Patent
Hutchison et al.

(10) Patent No.: US 8,706,983 B2
(45) Date of Patent: Apr. 22, 2014

(54) GARBAGE COLLECTION OF MEMORY BLOCKS USING VOLATILE MEMORY

(75) Inventors: Neil David Hutchison, Campbell, CA (US); Steven Sprouse, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 603 days.

(21) Appl. No.: 12/828,244

(22) Filed: Jun. 30, 2010

(65) Prior Publication Data

US 2012/0005406 A1   Jan. 5, 2012

(51) Int. Cl.
*G06F 12/00* (2006.01)
(52) U.S. Cl.
USPC ........... 711/159; 711/170; 711/171; 711/154; 718/104
(58) Field of Classification Search
USPC .................. 711/159, 170, 171, 154; 718/104
See application file for complete search history.

(56) References Cited

U.S. PATENT DOCUMENTS

| 7,451,265 | B2 | 11/2008 | Traister et al. |
| 7,716,422 | B2* | 5/2010 | Shin et al. ...................... 711/129 |
| 2004/0044888 | A1* | 3/2004 | Nalawadi et al. .................. 713/2 |
| 2006/0020745 | A1 | 1/2006 | Conley et al. |
| 2006/0155922 | A1 | 7/2006 | Gorobets et al. |
| 2008/0082736 | A1 | 4/2008 | Chow et al. |
| 2008/0094899 | A1* | 4/2008 | Honma et al. ........... 365/185.09 |
| 2008/0155301 | A1 | 6/2008 | Ahvenainen et al. |
| 2008/0209109 | A1 | 8/2008 | Lasser |
| 2008/0288717 | A1 | 11/2008 | Torabi |
| 2009/0006720 | A1 | 1/2009 | Traister |

FOREIGN PATENT DOCUMENTS

WO   WO 2005/066970   7/2005

OTHER PUBLICATIONS

The International Search Report and the Written Opinion of the International Searching Authority issued in corresponding PCT Appln. No. PCT/US2011/042274 dated Nov. 3, 2011 (8 pgs).

\* cited by examiner

*Primary Examiner* — Jae Yu
(74) *Attorney, Agent, or Firm* — Brinks Gilson & Lione

(57) ABSTRACT

A method and system for performing garbage collection operations on update blocks in a memory device using volatile memory is disclosed. When performing a garbage collection operation, a first part of the data related to the garbage collection operation is written to a volatile memory in the memory device, and a second part of the data related to the garbage collection operation is written to a non-volatile memory in the memory device. The first part of the data that is written to the volatile memory (such as a random access memory) may comprise control information (such as mapping information of the logical addressable unit to a physical metablock). The second part of the data related to the garbage collection that is written to the non-volatile memory (such as a flash memory) may comprise the consolidated data in the update block.

16 Claims, 10 Drawing Sheets

US 8,706,983 B2

GARBAGE COLLECTION OF MEMORY BLOCKS USING VOLATILE MEMORY

TECHNICAL FIELD

This application relates generally to memory devices. More specifically, this application relates to garbage collection of blocks in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system generally operates without knowledge of this mapping.

A drawback of memory systems that operate in a logical address space is fragmentation. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. Data previously written may become obsolete due to deletion and cause further fragmentation. The fragmented logical groups will need to be rewritten in full in a different physical block. Rewriting the fragmented logical groups may involve copying unrelated data from the prior location of the logical group, a process known as garbage collection. As fragmentation increases, the transfer speed of a memory system may decrease.

To provide a measure of memory system metrics, tests may be applied to the memory system to gauge the write performance of the memory system. For example, memory systems may have transfer speed specifications that can be rated by protocols such as the Speed Class specification from the SD Association, for example. The Speed Class specification includes Speed Classes 2, 4, and 6, which denote the guaranteed minimum transfer speeds for memory systems of 2, 4, and 6 MB/s, respectively. A Speed Class test run on a memory systems measures metrics such as the sequential write performance of an addressable unit (Pw), the time for a file allocation table (FAT) write (Tfw), and the rolling average of time for multiple FAT writes (Tfw(avg)). The Speed Class test run may also measure the performance of the memory system with fragmentation (Pc), which includes the corresponding read performance measurements. Garbage collection activity occurring during a Speed Class test can adversely affect the test results.

SUMMARY

In order to address the problems noted above, a method and system for controlling garbage collection in a memory device is disclosed.

According to one aspect of the invention, a method is disclosed for using volatile memory when performing a garbage collection operation in a memory device. The method includes using a controller to determine to perform a garbage collection operation, to write at least a first part of the data related to the garbage collection operation to a volatile memory in the memory device, and to write at least a second part of the data related to the garbage collection operation to a non-volatile memory in the memory device. The first part of the data that is written to the volatile memory (such as a random access memory) may comprise control information (such as mapping information of the logical addressable unit to a physical metablock). The second part of the data related to the garbage collection that is written to the non-volatile memory (such as a flash memory) may comprise the consolidated data in the update block. A system is also disclosed including a plurality of memory blocks and a memory controller that implements this method.

BRIEF DESCRIPTION OF THE PRESENTLY PREFERRED EMBODIMENTS

Figure 1:
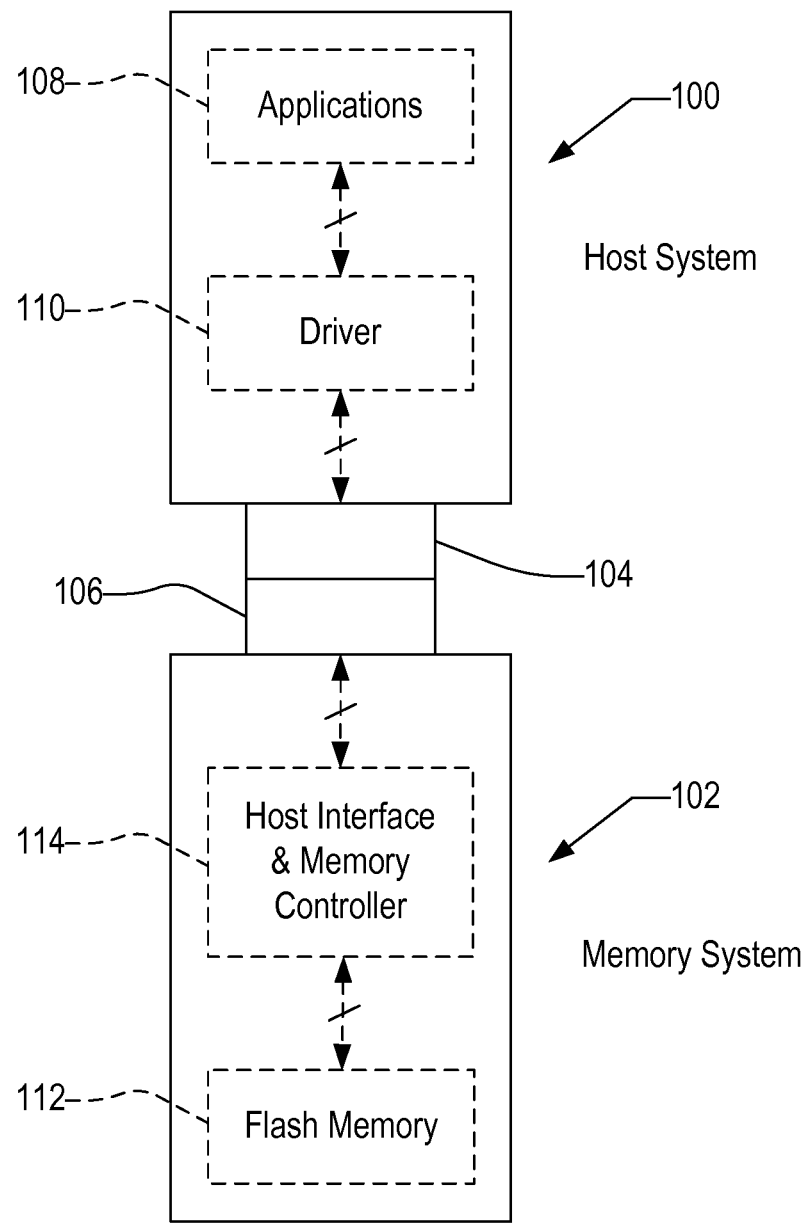
FIG. 1 is a block diagram of a host connected with a memory system having non-volatile memory.
Figure 2:
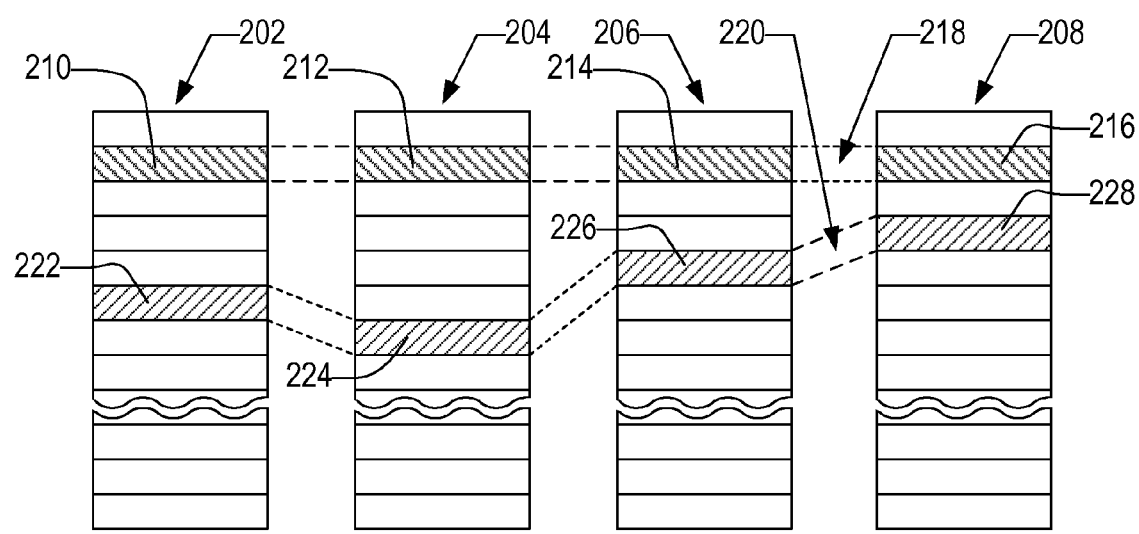
FIG. 2 illustrates an example physical memory organization of the system of FIG. 1.
Figure 3:
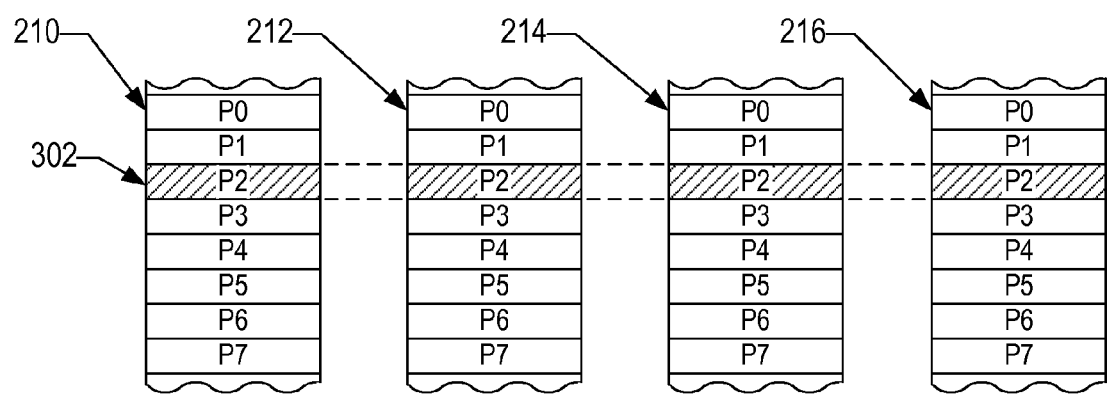
FIG. 3 shows an expanded view of a portion of the physical memory of FIG. 2.

A flash memory system suitable for use in implementing aspects of the invention is shown in FIGS. 1-3. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, Smart-Media, TransFlash, and microSD cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. In a PC, for example, the applications portion 108 can include a processor (such as a microprocessor) or other type of controller running word processing, graphics, control or other popular application software. In a camera, cellular telephone or other host system that is primarily dedicated to performing a single set of functions, the applications portion 108 includes a processor or other type of controller running software that operates the camera to take and store pictures, the cellular telephone to make and receive calls, and the like.

The memory system 102 of FIG. 1 includes flash memory 112, and circuits 114 that both interface with the host to which the card is connected for passing data back and forth and control the memory 112. The controller 114 typically converts between logical addresses of data used by the host 100 and physical addresses of the memory 112 during data programming and reading. The controller 114 may comprise a processor, a microcontroller, an application specific integrated circuit (ASIC), a field programmable gate array, a logical digital circuit, or other now known or later developed logical processing capability.

FIG. 2 conceptually illustrates an organization of the flash memory cell array 112 (FIG. 1) that is used as an example in further descriptions below. The flash memory cell array 112 may include multiple memory cell arrays which are each separately controlled by a single or multiple memory controllers 114. Four planes or sub-arrays 202, 204, 206, and 208 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 2 by rectangles, such as blocks 210, 212, 214, and 216, located in respective planes 202, 204, 206, and 208. There can be dozens or hundreds of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 210, 212, 214, and 216 are shown to form one metablock 218. All of the cells within a metablock are typically erased together. The blocks used to form a metablock need not be restricted to the same relative locations within their respective planes, as is shown in a second metablock 220 made up of blocks 222, 224, 226, and 228. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

The individual blocks are in turn divided for operational purposes into pages of memory cells, as illustrated in FIG. 3. The memory cells of each of the blocks 210, 212, 214, and 216, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 302 is illustrated in FIG. 3, being formed of one physical page from each of the four blocks 210, 212, 214, and 216. The metapage 302, for example, includes the page P2 in each of the four blocks but the pages of a metapage need not necessarily have the same relative position within each of the blocks. A metapage is the maximum unit of programming.

Figure 4:
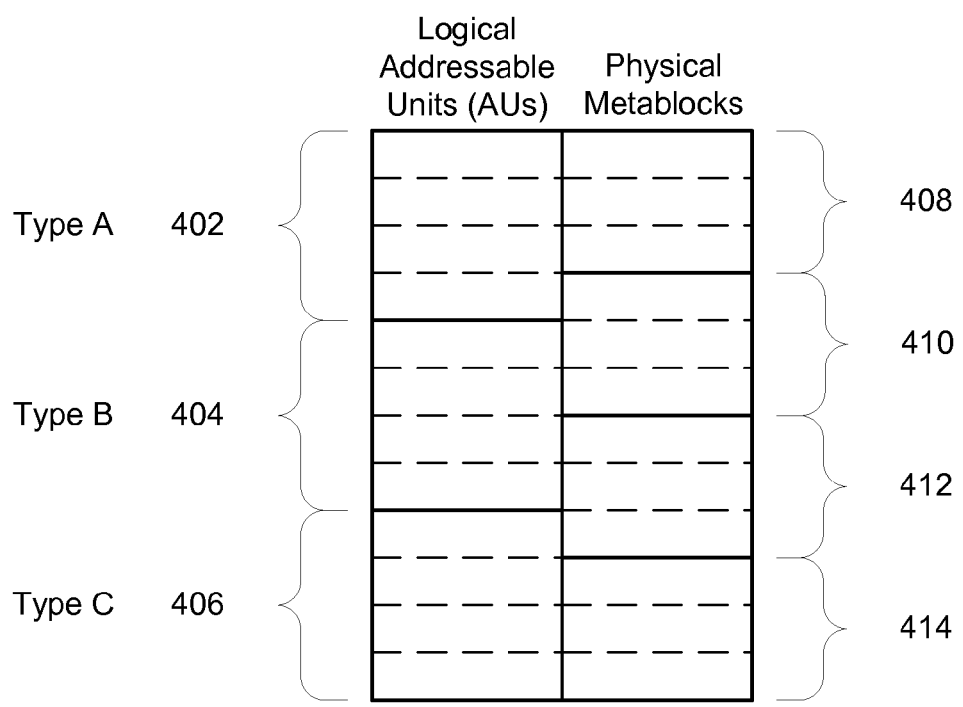
FIG. 4 illustrates the alignment of logical addressable units and physical metablocks.

FIG. 4 illustrates the alignment of logical addressable units and physical metablocks in a memory with three bits per cell (D3 memory). For example, the memory may be a 32 nm or 43 nm D3 flash memory by SanDisk Corporation with a total capacity of 2-32 GB. FIG. 4 is intended to illustrate the misalignment between the logical addressable units and physical metablocks and does not necessarily imply that addressable unit writes are performed in the order shown in the figure.

Figure 5:
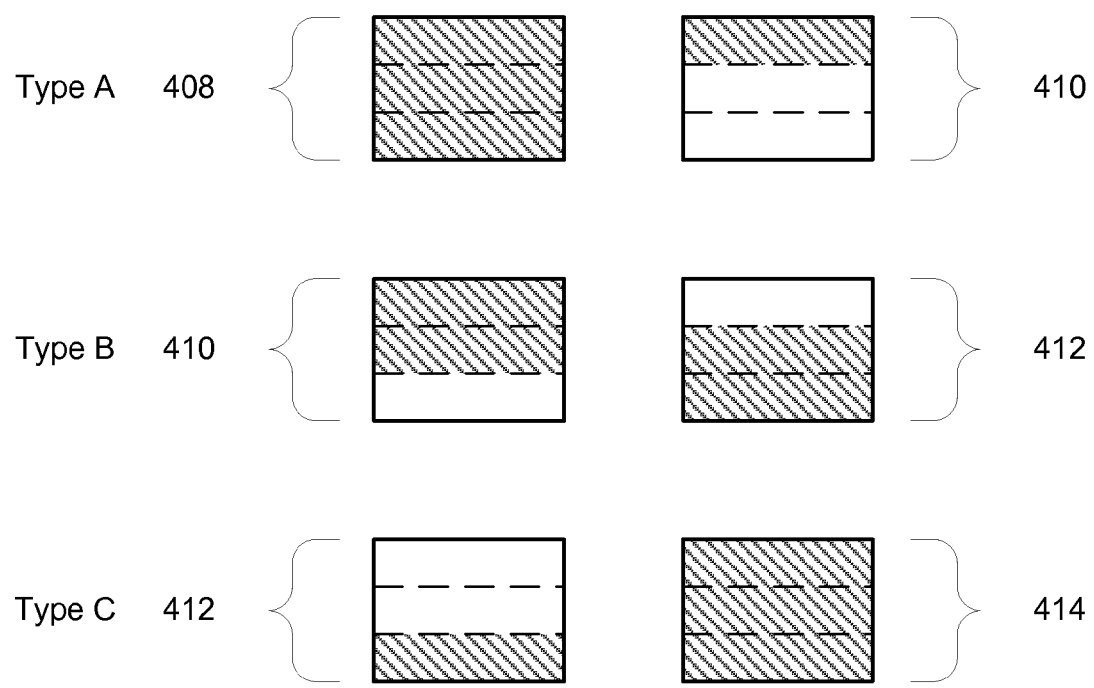
FIG. 5 illustrates the possible states of physical metablocks following the writing of data to the memory system.

In one example, the logical addressable unit size of a Secure Digital (SD) memory is 4 MB, as shown by units 402, 404, and 406. However, the physical metablock size in a D3 memory is 3 MB, as shown by metablocks 408, 410, 412, and 414. In FIG. 4, the dotted lines denote sizes of 1 MB each. Therefore, one or both of the boundaries of the logical addressable units do not align with the physical metablock boundaries. Because of this misalignment, if data is written to a particular logical addressable unit, the data is physically written to two metablocks, as shown in FIG. 5, resulting in unused space in one or both of the metablocks (the cross-hatched regions in FIG. 5 indicate space in the metablocks that are written with data and the empty regions indicate unused space). The unused space could cause the sequential write performance Pw of the memory system to be non-optimal if multiple garbage collection operations are needed to recover the unused space. The present example of the logical addressable unit size of 4 MB and of the physical metablock size of 3 MB is merely for illustration purposes. Other values are contemplated.

In particular, first, if data is written to addressable unit 402, all of metablock 408 and 1 MB of metablock 410 are written with the incoming data, and is referred to as a Type A addressable unit 502 in FIG. 5. Metablock 408 is full and closed, while metablock 410 has 2 MB of unused space. Second, if data is written to addressable unit 404, 2 MB of metablock 410 and 2 MB of metablock 412 are written with the incoming data. Addressable unit 404 is referred to as a Type B addressable unit 504. In this case, metablocks 410 and 412 are not full and each metablock has 1 MB of unused space. Finally, if data is written to addressable unit 406, 1 MB of metablock 412 and all of metablock 414 are written with the incoming data. Addressable unit 406 is referred to as a Type C addressable unit 506. Metablock 412 has 2 MB of unused space and metablock 414 is full and closed in this case.

A metablock that has incoming data written to it may also be referred to as an update block. If no unused update blocks are available when incoming data is to be written, one or more garbage collection operations are necessary to create update blocks for storing of the incoming data. As detailed further below, the open update block as a result of a Type A or Type C write would need 2 MB of future garbage collection. A Type B write would result in two open update blocks that each would need 1 MB of future garbage collection. In the case of a Type B write, if only one update block is to be created, then only 1 MB of future garbage collection is needed. Therefore, on average, any of the write types would result in garbage collection of up to 2 MB.

However, in some situations, a garbage collection operation of greater than 2 MB may be needed to create an unused update block in a D3 memory. The first situation occurs when all the open update blocks have 1 MB of data each. If a Type B write occurs, then two unused update blocks are needed to write the incoming data. Accordingly, two garbage collections of 2 MB each would be necessary for a total of 4 MB of garbage collection. The second situation occurs when there is one open update block with 2 MB of data and the remaining open update blocks have 1 MB of data each. Again, if a Type B write occurs, then two unused update blocks are needed to write the incoming data. In this case, a minimum of two garbage collections of 1 MB and 2 MB, respectively, would be necessary, for a total of 3 MB of garbage collection.

During a Speed Class Operation, for each write of an addressable unit, writes of the incoming data are written to the recording units making up the addressable unit. In a conventional memory system, a garbage collection operation is triggered when an update block is full. However, if a garbage collection operation occurs during a measurement segment of the Speed Class Operation, the Pw metric (sequential write performance of an addressable unit) may be negatively affected and the desired minimum transfer speed indicated by the Speed Class specification may not be met. The worst case scenario, as discussed above, would require two garbage collection operations of 2 MB each, for a total of 4 MB. A 4 MB garbage collection operation in a D3 memory would negatively affect the Pw metric.

Figure 6:
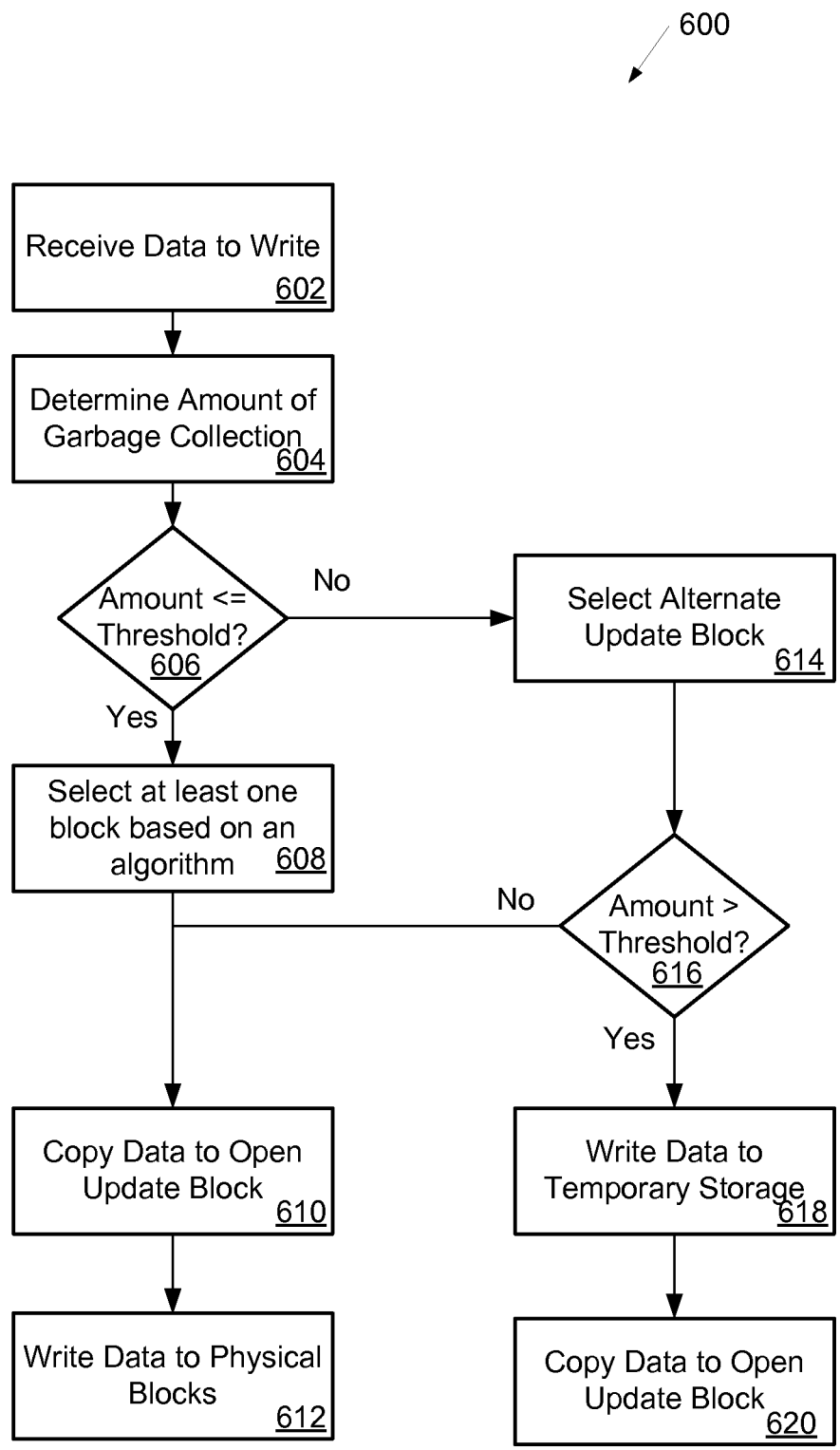
FIG. 6 is a flow diagram illustrating a method of optimizing performance of the memory device involving pre-emptive garbage collection of memory blocks.

FIG. 6 is a flow diagram illustrating a method 600 of optimizing performance of the memory device involving pre-emptive garbage collection of memory blocks. To avoid the worst case scenario described above, the method 600 performs pre-emptive garbage collection operations of a predetermined amount when there is a write of incoming data (such as each time there is a write of incoming data). In a D3 memory, the amount of pre-emptive garbage collection may be 2 MB, for example. The method 600 allows the memory device to meet the budget for performing work, such as a garbage collection operation, during a Speed Class Operation. The method 600 may be performed as a busy time process (such as operating during host commands) or idle time process (such as operating in between host commands). The memory controller 114 in the memory system 102 may implement the method 600, for example. Each of the steps described in FIG. 6 for the method 600 may be performed alone or in combination with other steps.

At step 602, incoming data to be written to a logical addressable unit is received by the memory device. Any type of data, including FAT and non-FAT data, may be written to the memory. The method 600 may not necessarily know whether a Speed Class Operation has begun but instead may operate at all times. At step 604, the amount of garbage collection needed due to the data write is determined. As detailed above, if no unused update blocks are available at the time of a data write, one or more open update blocks undergo a garbage collection operation to create unused update blocks. If an unused update block is available, it is possible that no amount of garbage collection is needed at step 604.

The amount of garbage collection determined at step 602 is compared to a predetermined threshold at step 606. The threshold may be 2 MB as for a D3 memory, for example, or may be another amount. The 2 MB threshold may be selected for a D3 memory such that the sequential write performance Pw of the memory is not negatively affected during a Speed Class Operation. If the amount of garbage collection is less than or equal to the threshold at step 606, then one or more blocks are selected based on an algorithm at step 608 for a garbage collection operation. Alternatively, step 606 may determine whether the amount of garbage collection is less than or equal to a first threshold and greater than or equal to a second threshold. If so, one or more blocks may be selected based on an algorithm at step 608 for a garbage collection operation.

One or more algorithms may be used to select the block at step 608. One example algorithm may include a least work to do (or least amount to copy) algorithm. The least work to do algorithm may analyze the data in one or more update blocks to determine the update block with the least amount of data to consolidate. The least work to do algorithm may examine a write pointer in the update block resource as an indicator of an amount of space needed to fill the update block. Another example algorithm may include a least recently used (LRU) algorithm to select the least recently used update blocks. The LRU algorithm may keep track of what blocks were used when in order to select the one or more least recently used update blocks. Still another example algorithm may include a most recently used (MRU) algorithm to select the most recently used update blocks. The MRU algorithm may keep track of what blocks were used when in order to select the one or more most recently used update blocks.

The threshold amount of garbage collection (such as the threshold in step 606) is forced by the method 600 even if the amount determined at step 604 is less than the threshold amount. The situation where the determined amount of garbage collection is less than the threshold may occur when the memory device is in a steady state, e.g., when all of the update blocks in the memory device are the result of data writes. At step 610, the garbage collection operation of the forced threshold amount is performed by copying data from other blocks to the update blocks selected at step 608. One or more unused update blocks are created as a result of the garbage collection operation. Finally, at step 612, the incoming data is written to the created unused update blocks and the method 600 is complete.

Figure 7:
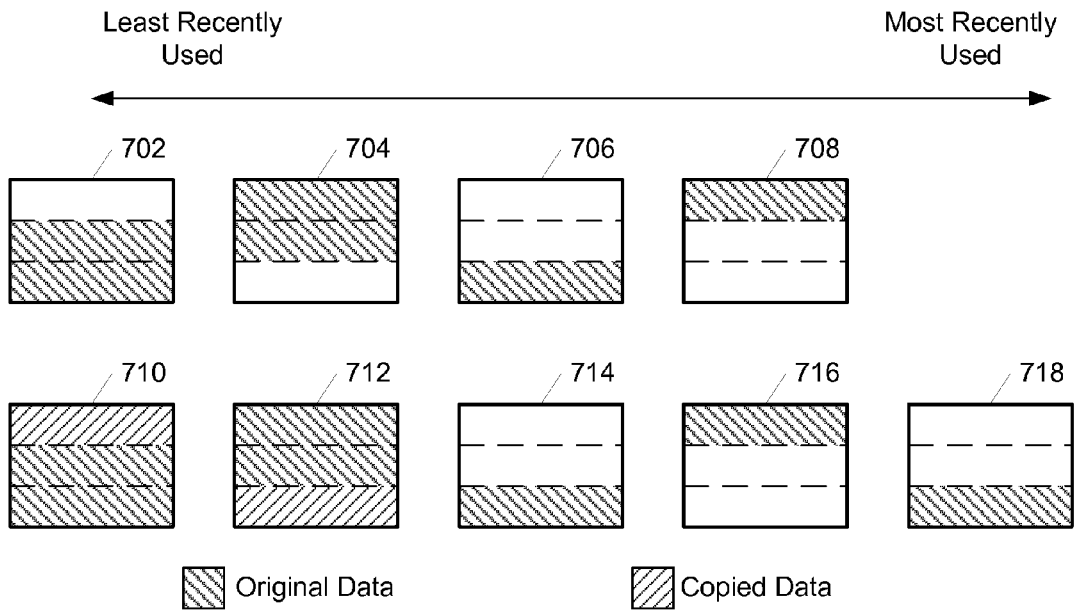
FIG. 7 illustrates a first example of memory blocks undergoing optimization of performance according to the method of FIG. 6.

FIG. 7 shows an example of update blocks undergoing the method 600 shown in FIG. 6 when the memory device is in a steady state. The top row of update blocks 702-708 shows open update blocks prior to a Type C data write, and the bottom row of update blocks 710-718 shows the update blocks following the Type C data write. In the top row, update blocks 702 and 704 are the results of a previous Type B data write, update block 706 is a result of a previous Type C data write, and update block 708 is a result of a previous Type A data write.

A Type C write of incoming data requires two update blocks to store the data, as discussed above. For a Type C write to a D3 memory, one update block is entirely filled with 3 MB of data and a second update block is filled with 1 MB of data and remains open. Update block 718 in the bottom row of FIG. 7, for example, shows the open update block after a Type C write. If no unused update blocks are available at the time of the data write, update block 702 is selected for garbage collection because it is the least recently used open update block. Update block 702 undergoes 1 MB of garbage collection, resulting in an intact update block 710 following the write. However, because a threshold amount (2 MB) of garbage collection is forced when using the method 600, update block 704 is also selected for a garbage collection operation. Update block 704 undergoes 1 MB of pre-emptive garbage collection and results in an intact update block 712 following the write. Update blocks 714 and 716 remain in the same state with the same data as update block 706 and 708, respectively, following the write.

Figure 8:
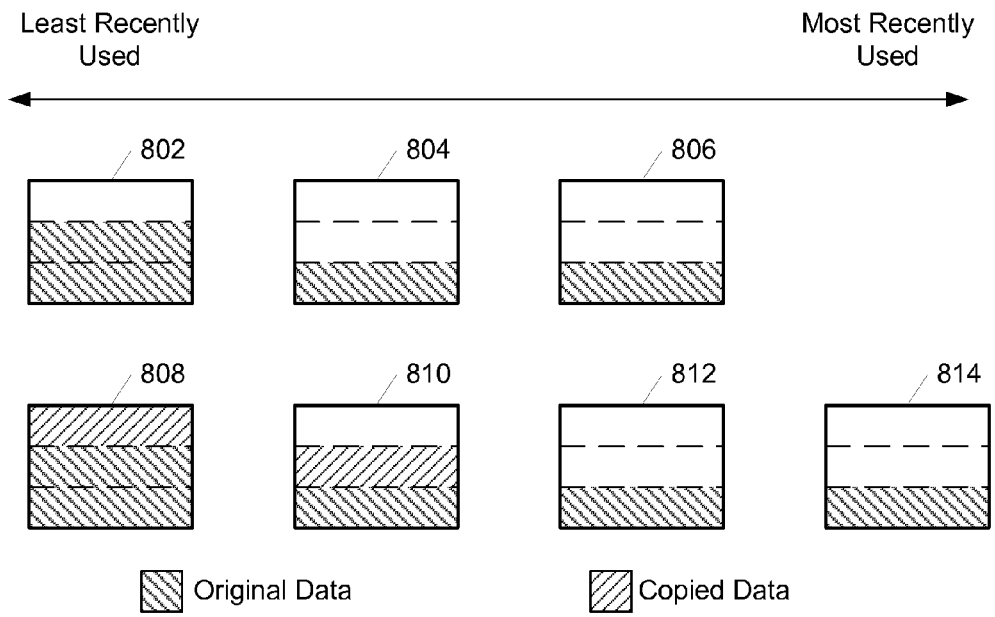
FIG. 8 illustrates a second example of memory blocks undergoing optimization of performance according to the method of FIG. 6.

FIG. 8 shows another example of update blocks undergoing the method 600 shown in FIG. 6 when the memory device is in a steady state. Similar to FIG. 7, the top row of update blocks 802-806 shows open update blocks prior to a Type C data write, and the bottom row of update blocks 808-814 shows the update blocks following the Type C data write. In the top row, update block 802 is a result of a previous Type B data write, and update blocks 804 and 806 are the results of previous Type C data writes.

In the example depicted in FIG. 8, a Type C write of incoming data for a D3 memory entirely fills one update block with 3 MB of data and a second update block with 1 MB of data. The second update block, for example, update block 814, remains open following the data write. If unused update blocks are available at the time of the data write, then no garbage collection would be needed in a conventional memory device for creating update blocks for the data write. However, according to the method 600, update blocks 802 and 804 are selected for pre-emptive garbage collection because they are the least recently used update blocks. Each update block 802 and 804 undergoes 1 MB of garbage collection. Accordingly, update block 802 results in an intact update block 808 following the data write. Another 1 MB is garbage collected from update block 804, resulting in update block 810. Update block 810 remains open because there is still 1 MB of space available. Update block 812 remains in the same state with the same data as update block 806 following the write. In this example, update blocks 802 and 804 are both pre-emptively garbage collected by the method 600 because no amount of garbage collection is necessarily required. For example, block 804 is only partially garbage collected.

Figure 9:
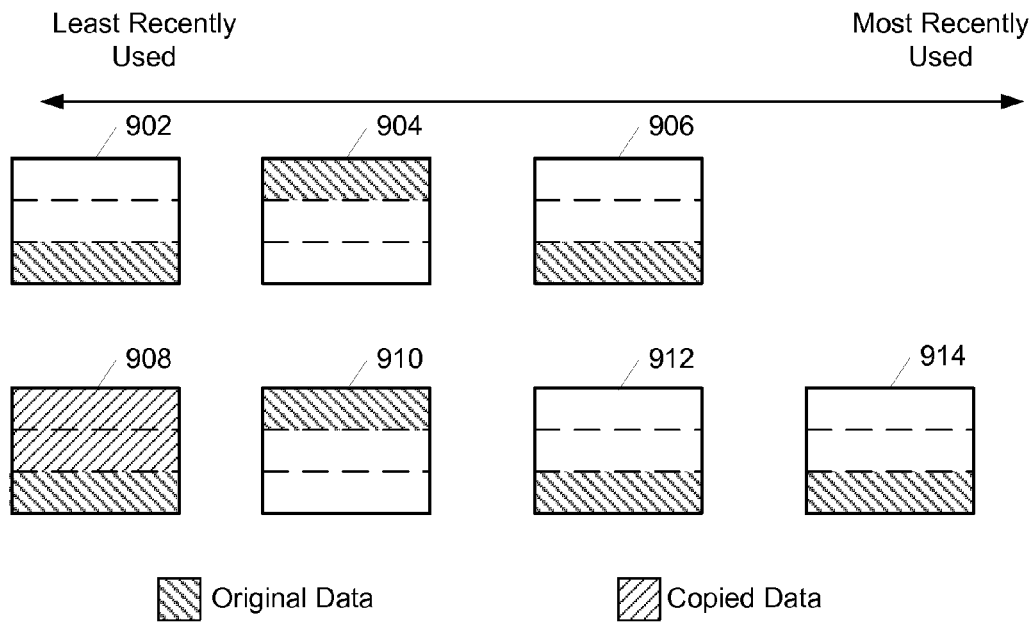
FIG. 9 illustrates a third example of memory blocks undergoing optimization of performance according to the method of FIG. 6.

FIG. 9 shows a further example of update blocks undergoing the method 600 shown in FIG. 6 when the memory device is in a steady state. The top row of update blocks 902-906 shows open update blocks prior to a Type C data write, and the bottom row of update blocks 908-914 shows the update blocks following the Type C data write. In the top row, update blocks 902 and 906 are a result of a previous Type C data write, and update block 904 is a result of a previous Type A data write.

A Type C write of incoming data for a D3 memory entirely fills one update block with 3 MB of data and a second update block with 1 MB of data. The second update block, for example, update block 914, remains open following the Type C data write. If unused update blocks are available, then no garbage collection would be required in a conventional memory device for creating unused update blocks for the data write. However, update block 902 is selected for garbage collection according to the method 600 because it is the least recently used update block. Update block 902 undergoes 2 MB of garbage collection, resulting in an intact update block 908 following the data write. Update blocks 910 and 912 remain the same with the same data as update blocks 904 and 906, respectively, following the data write. Update block 902 is pre-emptively garbage collected in this example because no amount of garbage collection is required by the Type C write.

Referring back to FIG. 6, if the amount of garbage collection determined at step 604 is greater than the threshold at step 606, the method 600 continues to step 614. At step 614, one or more alternate update blocks (that are not necessarily the least recently used update blocks) are selected for a garbage collection operation. This situation occurs when the memory device is in an initial condition state, e.g., when the update blocks in the memory device are not all a result of data writes. The least recently used update block, if selected, may need to undergo more than the threshold amount of garbage collection, resulting in a negative effect on a Speed Class Operation. By selecting alternate update blocks, the necessary garbage collection may still be performed without adversely affecting the sequential write performance measurement of the Speed Class Operation.

The alternate update block that is selected at step 614 is dependent on the type of data write at step 602. If a Type A or Type C write occurs, then an open update block with the least amount of required garbage collection is selected for a garbage collection operation at step 614. If the selected open update block does not require more than the threshold amount of garbage collection at step 616, then the garbage collection operation is performed at step 610 by copying data from other blocks to the selected open update block. The incoming data is then written at step 612 to the created unused update blocks. However, if the selected open update block requires more than the threshold amount of garbage collection at step 616, then the incoming data is written to a non-volatile storage area at step 618, such as to a binary cache or random access memory. A garbage collection operation of the threshold amount is still performed at step 620. For example, the data may be written to buffer random access memory (BRAM).

The data may be maintained in BRAM until the garbage collection completes the process of freeing an update block.

If a Type B write occurs at step 602, then one or more alternate open update blocks are selected for a garbage collection operation at step 614. If there are no unused update blocks, then one or more open update blocks are selected at step 614. For example, a first open update block may be selected during the write of the first 2 MB, and a second open update block may be selected when writing the second 2 MB. As another example, the multiple update blocks may be selected at the same time. If the total amount of data needed to garbage collect the two selected update blocks is greater than the threshold amount at step 616, then the incoming data is written to a temporary storage area at step 618. A garbage collection of the threshold amount is still performed at step 620. However, if the total amount of data needed to garbage collect the two selected update blocks is less than or equal to the threshold amount at step 616, then garbage collection operation is performed at step 610. In this case, the selected update block with less than or equal to half of the threshold amount is garbage collected first, followed by a garbage collection operation on the other selected update block. The incoming data is written to the created unused update blocks at step 612.

Figure 10:
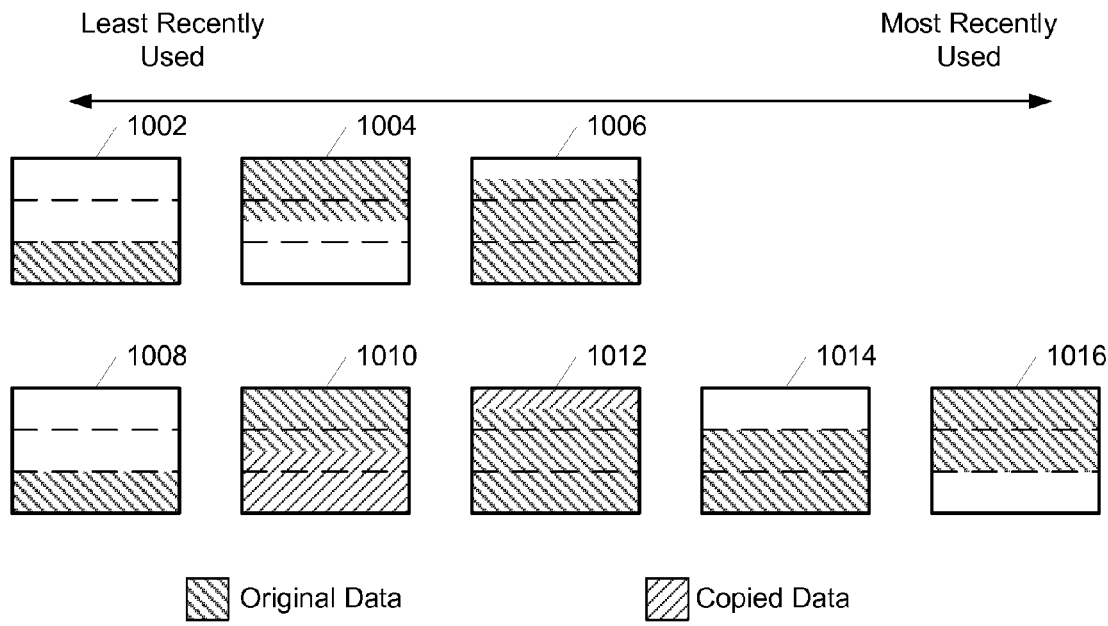
FIG. 10 illustrates a fourth example of memory blocks undergoing optimization of performance according to the method of FIG. 6.

FIG. 10 shows an example of update blocks undergoing the method 600 shown in FIG. 6 when the memory device is in an initial condition state. The top row of update blocks 1002-1006 shows open update blocks prior to a Type B data write, and the bottom row of update blocks 1008-1014 shows the update blocks following the Type B data write. In the top row, update block 1002 is a result of a previous Type C data write. Update block 1004 is filled with 1.5 MB of data and update block 1006 is filled with 2.5 MB of data. Accordingly, update block 1004 would need 1.5 MB of future garbage collection and update block 1006 would need 0.5 MB of future garbage collection.

A Type B write of incoming data for a D3 memory would fill two update blocks with 2 MB of data each, leaving both update blocks open with 1 MB of available space following the data write. Update blocks 1014 and 1016, for example, show the resulting open update blocks following a Type B write in this case. Because a Type B write results in two open update blocks, two currently open update blocks need to be garbage collected in order to create two unused update blocks. In this example, if the two least recently used open update blocks are selected, more than the threshold amount of 2 MB would be garbage collected. In particular, update block 1002 would undergo 2 MB of garbage collection and update block 1004 would undergo 1.5 MB of garbage collection, resulting in a total of 3.5 MB of garbage collection.

Because the amount of garbage collection exceeds the threshold, alternate update blocks are selected for garbage collection instead of the least recently used update blocks. In this example, update blocks 1004 and 1006 are selected for garbage collection, with update block 1006 being garbage collected first because it is the block with less than or equal to half the threshold, e.g., 0.5 MB, and the garbage collection of update block 1006 results in the intact update block 1012 following the data write. Update block 1004 undergoes garbage collection with an amount of 1.5 MB, resulting in the intact update block 1010 following the data write. Update block 1008 remains the same as update block 1002 following the data write. By selecting alternate update blocks in this scenario rather than the least recently used update blocks, the threshold amount of garbage collection is still pre-emptively performed.

Figure 11:
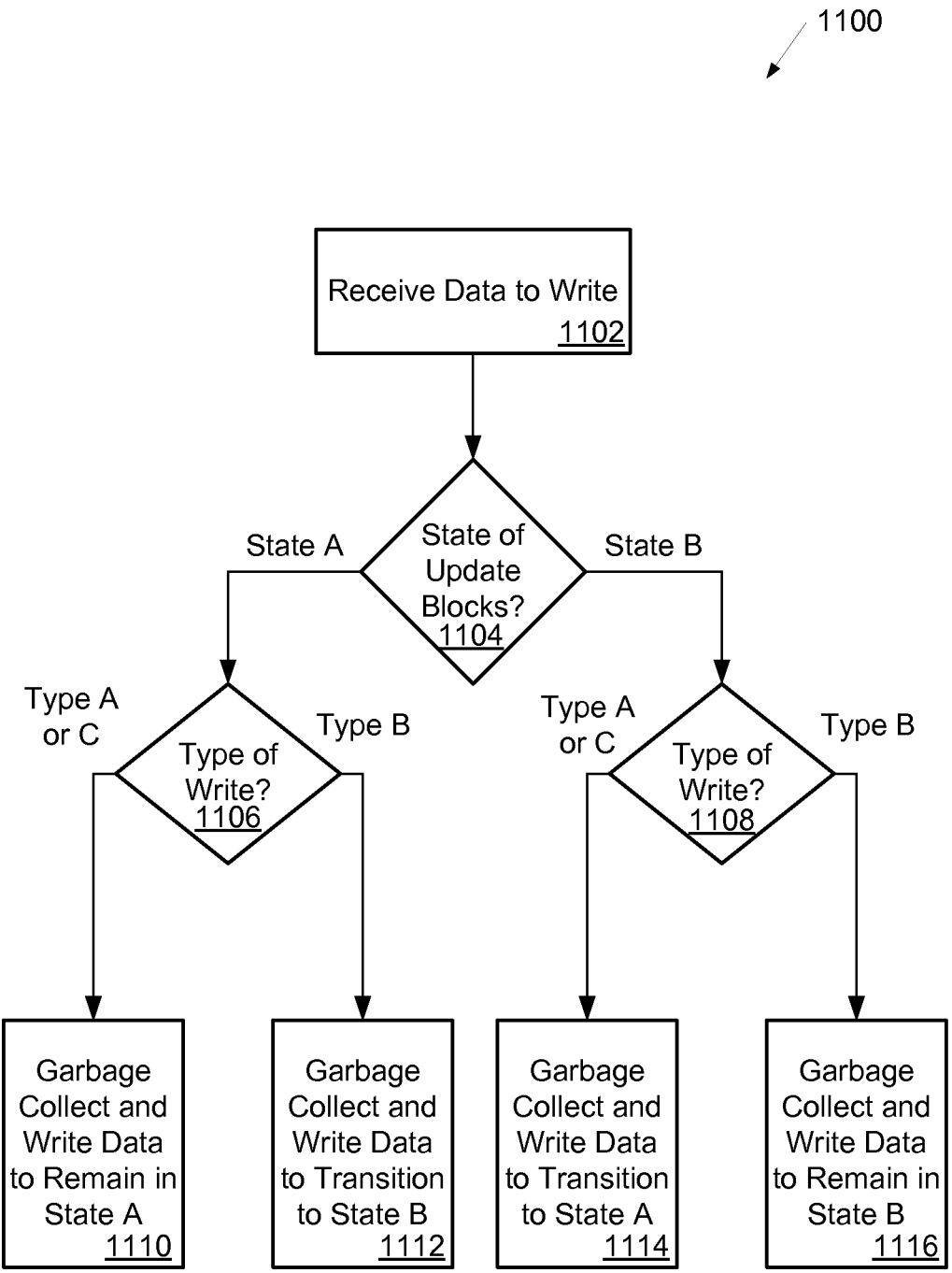
FIG. 11 is a flow diagram illustrating the alternative method of optimizing performance of the memory device involving the state machine of FIG. 12.
Figure 12:
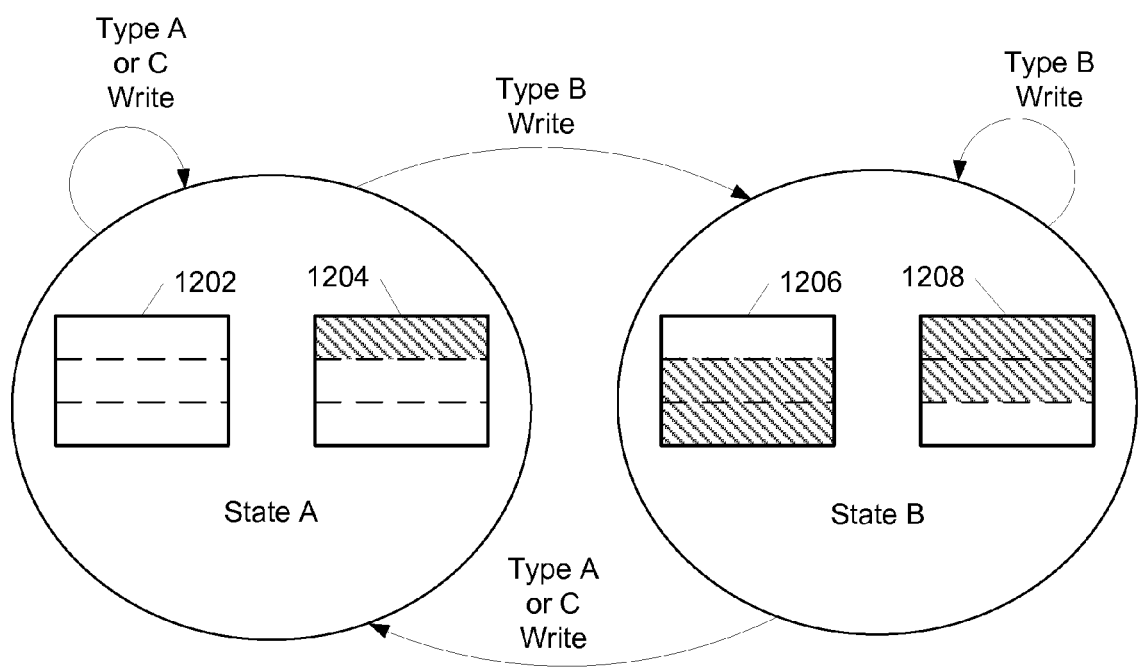
FIG. 12 illustrates a state machine related to an alternative method of FIG. 11 for optimizing performance of a memory device.

FIG. 11 is a flow diagram illustrating an alternative method 1100 of optimizing performance of the memory device involving the state machine of FIG. 12. The method 1100 describes an alternative algorithm for selecting an open update block for garbage collection, instead of selecting the least recently used update block for garbage collection, such as discussed above with respect to step 608 of the method 600 of FIG. 6. The method 1100 may be used when the memory device is in a steady state, e.g., when all of the update blocks in the memory device are the result of data writes. The method 1100 allows the memory device to meet the budget for performing work, such as a garbage collection operation, during a Speed Class Operation. The method 1100 may be performed as a busy time process or idle time process. The memory controller 114 in the memory system 102 may implement the method 1100, for example. Each of the steps described in FIG. 11 for the method 1100 may be performed alone or in combination with other steps.

In the method 1100, two update blocks are always selected for garbage collection operations. The two update blocks are in one of two states, State A or State B, as shown in FIG. 12. In State A, update block 1202 is unused and update block 1204 is an open update block as a result of a prior Type A or Type C data write. Update block 1202 contains no data and does not require future garbage collection, while update block 1204 has 1 MB of data and would require 2 MB of future garbage collection. State B includes update blocks 1206 and 1208, which are open update blocks as a result of a prior Type B data write. Each update block 1206 and 1208 contains 2 MB of data and would require 1 MB of future garbage collection. A memory device may utilize the method 1100 once two update blocks are found in either State A or State B. The alternate update block selection of described in steps 614-618 of the method 600 may be utilized when the memory device is in an initial condition state in order to achieve the steady state needed to use the method 1100.

Transitioning between and within State A and State B requires 2 MB of garbage collection in a D3 memory. Because 2 MB of garbage collection is always performed in order to transition between and within the states, the garbage collection budget is met and a Speed Class Operation is not negatively affected. At step 1102 of the method 1100, incoming data to be written to a logical addressable unit is received by the memory device. Any type of data, including FAT and non-FAT data, may be written to the memory. The method 1100 does not know whether a Speed Class Operation has begun but instead may operate at all times.

At step 1104, it is determined whether the two selected update blocks are in State A or State B, as described in FIG. 12. If the update blocks are in State A, then the method 1100 continues to step 1106 where it is determined what type of data write occurring at step 1102. If the data write is a Type A or Type C data write, then the update blocks 1202 and 1204 are garbage collected at step 1110 such that the update blocks remain in State A. In particular, the update blocks 1202 and 1204 remain in State A because a Type A or Type C data write results in an open update block containing 1 MB of data and 2 MB of available space. However, if the type of data write at step 1106 is a Type B write, then the update blocks 1202 and 1204 undergo garbage collection at step 1112 such that the update blocks transition to State B and the update blocks become update blocks 1206 and 1208. In this case, the update blocks 1202 and 1204 transition to State B because the Type B data write results in two open update blocks each containing 2 MB of data and 1 MB of available space. In steps 1110 and 1112, the incoming data to be written is also stored in one or more update blocks.

On the other hand, at step 1104, if it is determined that the two selected update blocks are in State B, then the method 1100 continues to step 1108. At step 1108, it is determined what type of data write has occurred at step 1102. If the data write is a Type A or Type C data write, then the update blocks 1206 and 1208 are garbage collected at step 1114 such that the update blocks transition to State A and become update blocks 1202 and 1204. In particular, the update blocks 1206 and 1208 transition to State A because a Type A or Type C data write results in an open update block containing 1 MB of data and 2 MB of available space. However, if the type of data write at step 1108 is a Type B write, then the update blocks 1206 and 1208 are garbage collected at step 1116 such that the update blocks remain in State B. In this case, the update blocks 1206 and 1208 remain in State B because the Type B data write results in two open update blocks each containing 2 MB of data and 1 MB of available space. As before, in both steps 1114 and 1116, the incoming data to be written is stored in one or more update blocks.

Figure 13:
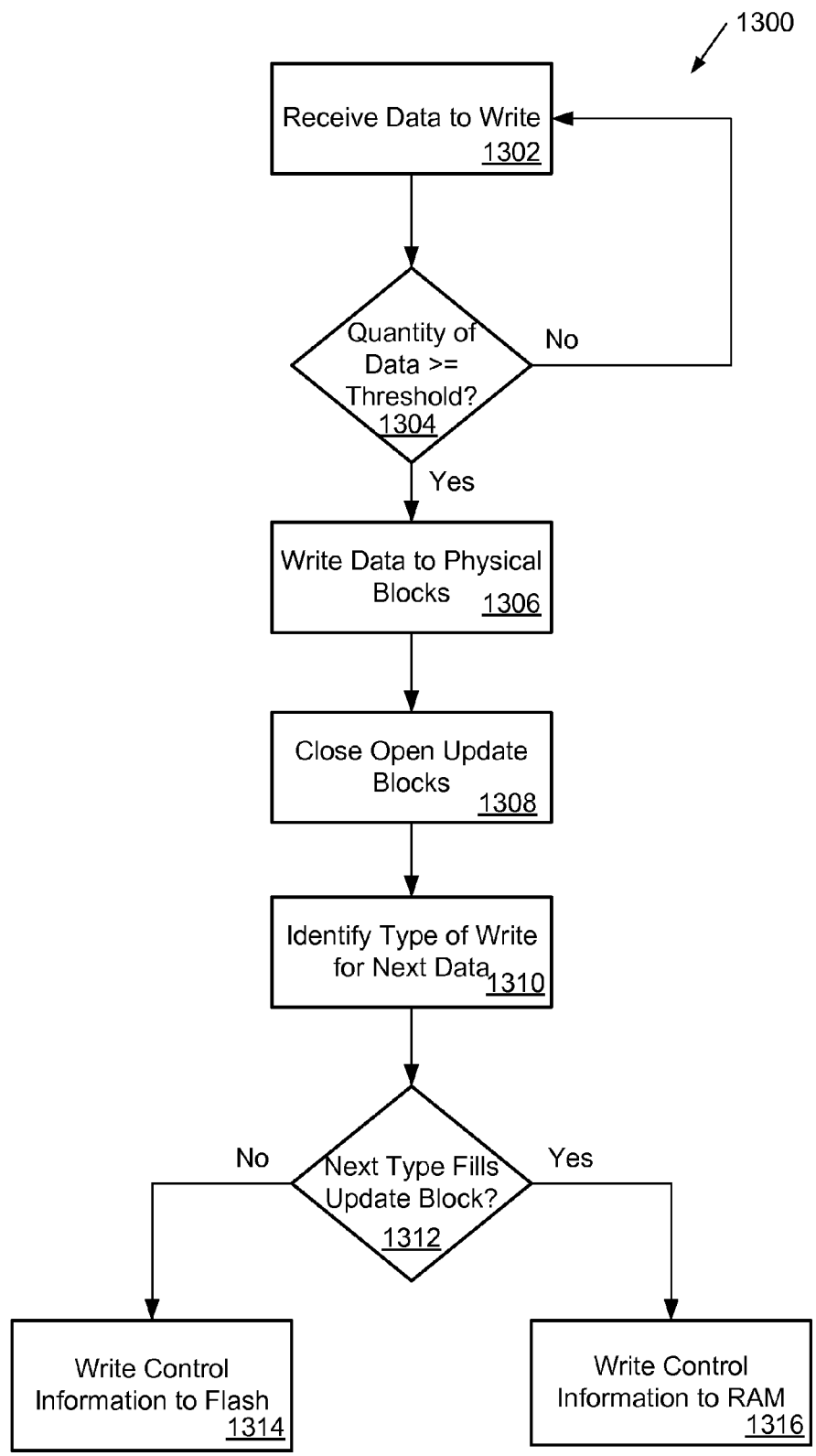
FIG. 13 is a flow diagram illustrating a method of optimizing performance of the memory device involving copying of control information to a random access memory.

FIG. 13 is a flow diagram illustrating a method 1300 of optimizing performance of the memory device involving copying of at least a part of the data related to garbage collection to a volatile memory. In one embodiment, some or all of control information for an update block may be copied to a random access memory or other type of volatile memory. In another embodiment, some or all of the fragmented data subject to garbage collection may be copied to a random access memory or other type of volatile memory. The copied fragmented data may thereafter be copied into a non-volatile memory. In still another embodiment, some or all of the control information and some or all of the fragmented data subject to garbage collection may be copied to a random access memory or other type of volatile memory.

Using volatile memory, such as the random access memory, to temporarily store a part of the information, such as the control information, may improve the performance of the memory device during a Speed Class Operation. The method 1300 may be performed as a busy time process or idle time process. The memory controller 114 may implement the method 1300, for example. Each of the steps described in FIG. 13 for the method 1300 may be performed alone or in combination.

At step 1302, incoming data to be written to a logical addressable unit is received by the memory device. At step 1304, the quantity of the incoming data that has been received is compared to a threshold. Detection of the quantity of data may be restricted to when the start of the data is received in lengths of recording units. When data to be written to a logical addressable unit is received in lengths of recording units, a Speed Class Operation may have been started. If an addressable unit has a length of 4 MB, the recording unit has a length of 16 kB, for example. If the quantity of data detected at step 1304 is below the threshold, then the method 1300 returns to step 1302 to receive more incoming data.

However, if the quantity of data is at or above the threshold at step 1304, then the method 1300 continues to step 1306. The threshold may be 80% of the logical addressable unit, or may be another quantity or percentage. The incoming data is written to the physical blocks of the memory device at step 1306. At step 1308, garbage collection of any open update blocks in the memory device is performed. Any amount of garbage collection may be performed at step 1308 as necessary without negatively affecting the Speed Class Operation. There is no negative effect on the Speed Class Operation because the first addressable unit write of a Speed Class Operation is not used to measure the sequential write performance Pw.

In one embodiment, following the garbage collection operation performed at step 1308, the write type of the next data to be written is identified, as shown at step 1310. The write type, either Type A, B, or C, as described previously, may be determined by examining the logical starting address of the addressable unit being written.

In one embodiment, some or part of the data related to garbage collection may be automatically written to a volatile memory. In an alternate embodiment, some or part of the data related to garbage collection may be written to a volatile memory depending on one or more characteristics of the garbage collection. For example, the determination whether to write a part of the data related to garbage collection may be dependent on the write type. In particular, control information about an update block may be stored in either a random access memory or a flash memory depending on the identified write type. As another example, the determination whether to write a part of the data related to garbage collection may be dependent on whether the write fills the update block. Specifically, a determination is made whether to write a part of the information to a volatile memory. For example, the determination may be based on analyzing the next incoming data. In particular, at step 1312, it is determined whether the identified write type of the next incoming data will fill an update block and create an intact block. If the write type of the next incoming data will completely fill the update block, then a part of the information is stored in volatile memory, such as the control information is stored in a random access memory (RAM) at step 1316. The control information may include mapping information of the logical addressable unit to a physical metablock or other information. Examples of control information include, but are not limited to logical group, metablock number, write pointer, and page tag.

By storing the control information in a RAM instead of the flash memory, the maximum number of usable update blocks in the memory device may be extended, resulting in a reduction of forced garbage collection operations due to lack of resources. However, if the write type of the next incoming data will not completely fill the update block at step 1312, then the control information for the logical addressable unit is stored in the flash memory at step 1314.

If the control information is stored in a RAM, a power cycle flag or other indicator corresponding to the logical addressable unit may be set in the flash memory. By using a power cycle flag, if a loss of power to the memory device occurs before the update block with the control information stored in the RAM is closed, then recovery of the control information may occur upon re-initialization of the memory device. After re-initialization begins, if the power cycle flag is set, then the control information may be reconstructed (even though the control information previously stored in RAM is lost). One manner in which to reconstruct the control information is by using the free update block list, which is a list of the update blocks that are free. In particular, the free update block list may be used to determine the update blocks that are free, and at least a part of the data associated with those free update blocks may be analyzed. For example, the header information may be analyzed (such as the header information in the first page), so that the data contained in the update block may be determined. Once the data contained in the update block is determined, the control information may be constructed. The reconstructed control information for this update block may be subsequently stored in flash memory following the garbage collection of another update block after re-initialization of the memory device. Or, the reconstructed control information for this update block may again be stored in volatile memory (such as RAM).

Figure 14:
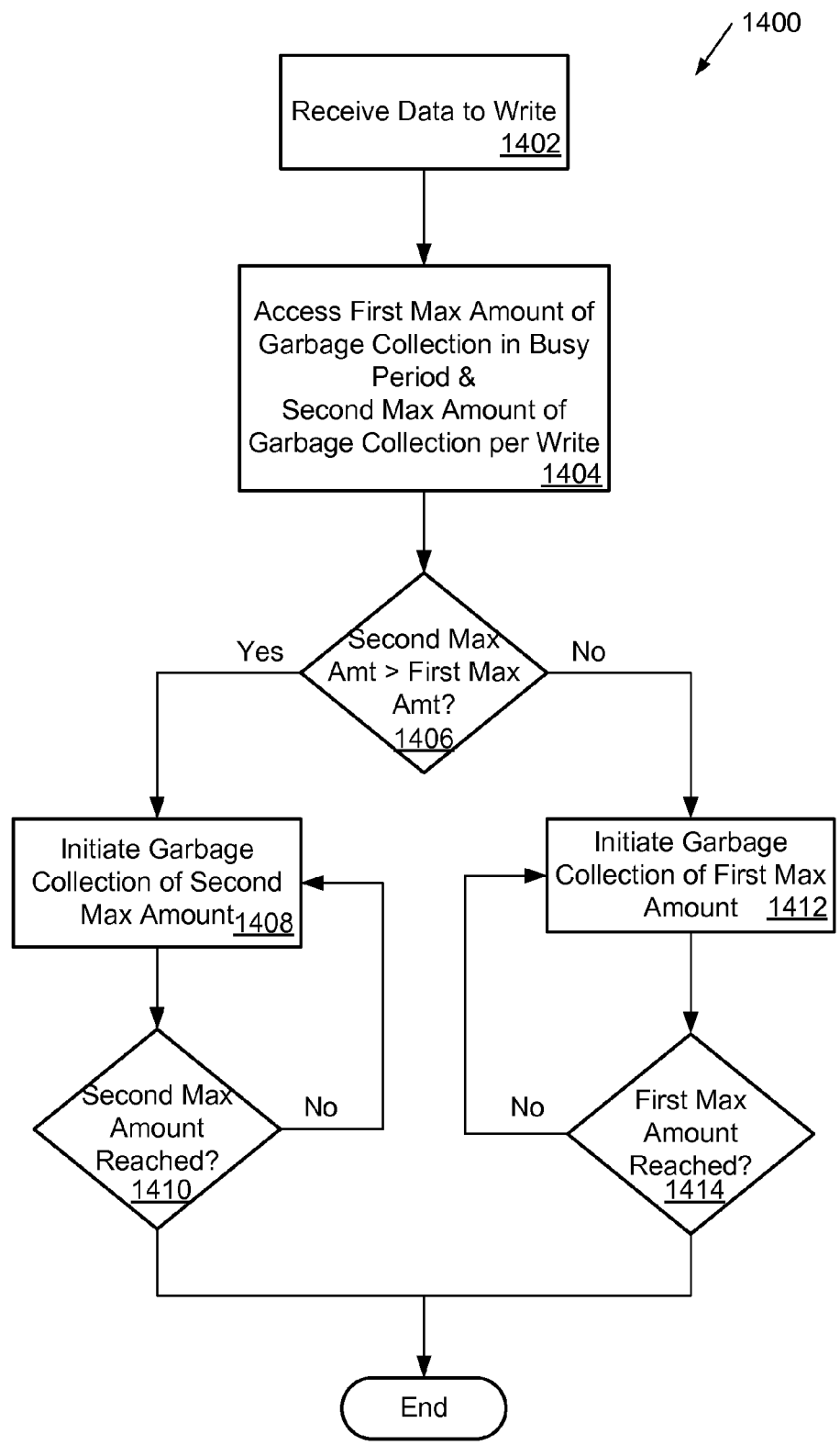
FIG. 14 is a flow diagram illustrating a method of optimizing performance of the memory device involving monitoring of amounts of garbage collection.

FIG. 14 illustrates a flow diagram to select which mode of operation to perform garbage collection (such as a pre-emptive garbage collection). A particular memory device may perform garbage collection differently in different modes of operation. One mode of operation may be more efficient to perform garbage collection than another mode of operation. For example, a 32 nanometer flash memory may operate in a first mode of operation (such as garbage collection in a busy period) and operate in a second mode of operation (such as garbage collection during a write of the logical addressable unit). The amount of garbage collection for the 32 nanometer flash memory that may be performed in the first mode of operation may differ from the amount of garbage collection that may be performed for the second mode of operation. As another example, a 70 nanometer flash memory may perform garbage collection differently in a first mode of operation (such as garbage collection in a busy period) than in the second mode of operation (such as garbage collection during a write of the logical addressable unit).

Previously, garbage collection was performed when it was necessary to be performed due to memory constraints. In contrast, garbage collection may be performed in a selected mode of operation when the flash memory is more efficient to perform the garbage collection, such as illustrated in FIG. 14. As discussed above, garbage collection may be pre-emptively performed (such as discussed with respect to FIG. 6). In pre-emptively performing garbage collection, the flash memory may determine the mode of operation where it is better (or best) to perform the garbage collection. For example, the flash memory may determine that garbage collection is more efficient if performed during a busy period. If so, the flash memory may perform pre-emptive garbage collection during the busy period. As another example, the flash memory may determine that garbage collection is more efficient if performed during a write of the logical addressable unit. If so, the flash memory may perform pre-emptive garbage collection during a write of the logical addressable unit.

FIG. 14 is a flow diagram illustrating a method 1400 that shows a specific example of selecting which mode to perform garbage collection, namely optimizing performance of the memory device by monitoring amounts of garbage collection. The memory may determine which mode to perform garbage collection based on one or more indicators, such as indicators based on maximum amounts of garbage collection in different periods of operation. In particular, the method 1400 monitors the maximum amount of garbage collection in a single busy period of the memory device and the maximum amount of garbage collection copied during a write of a logical addressable unit. By using the method 1400, the maximum amount of garbage collection in a busy period may be pre-emptively performed, even if it is not required. The method 1400 may be performed as a busy time process or idle time process. The memory controller 114 may implement the method 1400, for example. Each of the steps described in FIG. 14 for the method 1400 may be performed alone or in combination.

At step 1402, incoming data to be written to a logical addressable unit is received by the memory device. Two parameters are accessed at step 1404 after the incoming data is received. The first parameter is the maximum amount of garbage collection that can be performed in a single busy period of the memory device. A busy period may comprise the duration of a read of data from the memory device or a write of data to the memory device. The second parameter is the maximum of garbage collection that can be performed during a write of the logical addressable unit. It is possible that the two parameters may be equal, but it is more likely that the second parameter will be higher than the first parameter. The two parameters may be stored in a RAM. As shown in FIG. 14, the two parameters are compared to one another to determine which mode the memory device is more efficient at garbage collection. In an alternate embodiment, the memory device may include a different indicator to indicate which mode is more efficient for garbage collection. For example, the memory device may include a garbage_collection_mode_flag that indicates which mode is more efficient at garbage collection. In this way, the memory device does not need to determine which mode is the more efficient (such as by accessing the maximum amounts), and may simply access the flag to determine the more efficient mode.

At step 1406, if the second parameter is higher than the first parameter, then the method 1400 continues to step 1408. At step 1408, garbage collection of the update block is initiated up to the amount of the second parameter. The garbage collection operation is performed through steps 1408 and 1410 until the amount of garbage collection reaches the amount of the second parameter. If the second parameter is not higher than the first parameter at step 1406, then garbage collection of the update block is initiated up to the amount of the first parameter at step 1412. In this case, the garbage collection operation is performed through steps 1412 and 1414 until the amount of garbage collection reaches the amount of the first parameter. The amount of data copied during a garbage collection operation during a write to a single logical addressable unit is maximized when using the method 1400. In particular, even if the logical addressable unit is completely written to the update block, then garbage collection continues on the update block until the maximum amount according the first or second parameter is reached.

It is intended that the foregoing detailed description be regarded as illustrative rather than limiting, and that it be understood that it is the following claims, including all equivalents, that are intended to define the spirit and scope of this invention.

We claim:

1. A method of using volatile memory when performing a garbage collection operation in a memory device, the method comprising:
    with a controller in the memory device:
    determining to perform a garbage collection operation;
    detecting whether a quantity of incoming data for writing is equal to or exceeds a predetermined percentage of a first update block;
    if the quantity of incoming data is detected as equal to or exceeding the predetermined percentage of the first update block:
      closing open update blocks during a first addressable unit write operation;
      identifying an addressable unit type for a next quantity of incoming data;
    writing at least a first part of the data related to the garbage collection operation to a volatile memory in the memory device;
    writing at least a second part of the data related to the garbage collection operation to a non-volatile memory in the memory device,
    wherein writing the at least a first part of the data related to the garbage collection operation to a volatile memory in the memory device is dependent on at least one characteristic of the garbage collection operation,
    wherein the at least one characteristic comprises whether an update block is filled in the garbage collection operation, wherein the volatile memory comprises a random access memory, wherein if the identified addressable unit type for the next quantity of incoming data will completely fill a second update block, control information about the second update block is written to the volatile memory; and wherein if the identified addressable unit type for the next quantity of incoming data will not completely fill the second update block, the control information about the second update block is written to the non-volatile memory.

2. The method of claim 1, wherein the at least a first part of the data comprises control information.

3. The method of claim 2, wherein the control information comprises mapping information of a logical addressable unit to a physical metablock.

4. The method of claim 2, further comprising reconstructing at least a part of the control information.

5. The method of claim 4, wherein the control information is reconstructed by analyzing at least a part of header information for free update blocks.

6. The method of claim 1, further comprising, if the identified addressable unit type for the next quantity of incoming data will completely fill a second update block, writing the incoming data to the random access memory.

7. The method of claim 1, further comprising, if the identified addressable unit type for the next quantity of incoming data will not completely fill the second update block, writing the incoming data to the flash memory.

8. The method of claim 1, where detecting whether a quantity of incoming data for writing is equal to or exceeds a predetermined percentage of a first update block comprises:
receiving the incoming data to written to a logical addressable unit in lengths of recording units.

9. The method of claim 1, further comprising, if the quantity of incoming data is detected as equal to or exceeding the predetermined percentage of the first update block:
setting a power cycle flag in the flash memory; and
if the memory device is power cycled and the power cycle flag is set: reconstructing the first update block and the second update block
based on the control information written to the random access memory.

10. The method of claim 1, further comprising, if the identified addressable unit type for the next quantity of incoming data will completely fill a second update block:
initiating a garbage collection operation on an open update block in the flash memory; and
copying the incoming data from the random access memory to the open update block, based on the control information stored in the random access memory.

11. A memory device comprising:
a volatile memory;
a non-volatile memory; and
a controller in communication with the volatile memory and the non-volatile memory, the controller configured to:

determine to perform a garbage collection operation;
detect whether a quantity of incoming data for writing is equal to or exceeds a predetermined percentage of a first update block;
if the quantity of incoming data is detected as equal to or exceeding the predetermined percentage of the first update block:
close open update blocks during a first addressable unit write operation;
identify an addressable unit type for a next quantity of incoming data;
write at least a first part of the data related to the garbage collection operation to the volatile memory in the memory device dependent on whether an update block is filled in the garbage collection operation; and
write at least a second part of the data related to the garbage collection operation to the non-volatile memory in the memory device, wherein the volatile memory comprises a random access memory, wherein if the identified addressable unit type for the next quantity of incoming data will completely fill a second update block, the controller is configured to write control information about the second update block to the volatile memory, and wherein if the identified addressable unit type for the next quantity of incoming data will not completely fill the second update block, the controller is configured to write the control information about the second update block to the non-volatile memory.

12. The memory device of claim 11, wherein the at least a first part of the data comprises control information.

13. The memory device of claim 12, wherein the controller is further configured to reconstruct at least a part of the control information.

14. The memory device of claim 11, wherein the controller is further configured to:
if the identified addressable unit type for the next quantity of incoming data will completely fill a second update block, write the incoming data to the random access memory.

15. The memory device of claim 11, wherein the controller is further configured to:
if the identified addressable unit type for the next quantity of incoming data will not completely fill the second update block, write the incoming data to the flash memory.

16. The memory device of claim 11, where the controller is configured to detect whether a quantity of incoming data for writing is equal to or exceeds a predetermined percentage of a first update block by:
receiving the incoming data to written to a logical addressable unit in lengths of recording units.

* * * * *